Patented June 11, 1940

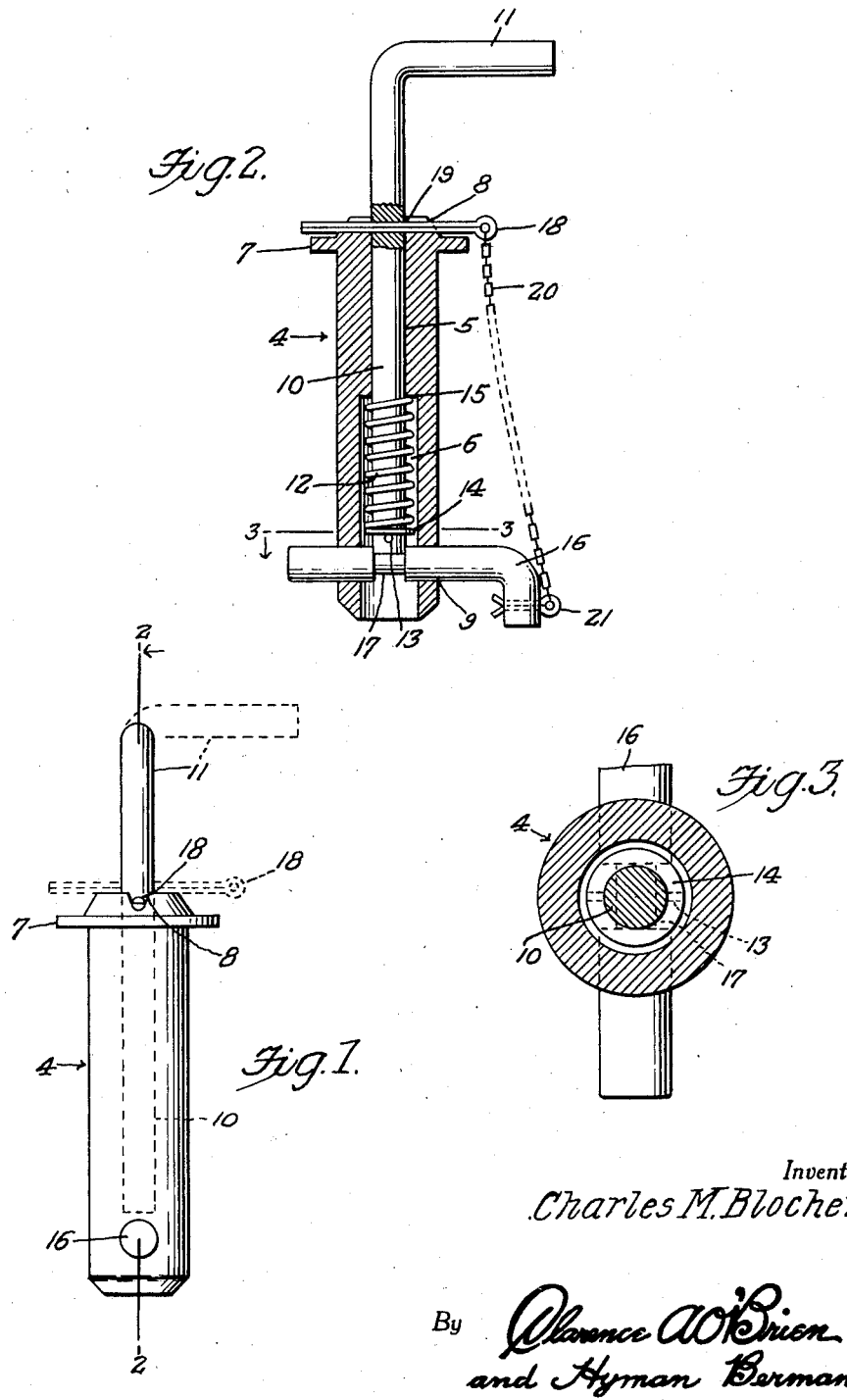

2,204,116

UNITED STATES PATENT OFFICE 2,204,116

SAFETY-LOCK EQUIPPED COUPLING PIN

Charles M. Blocher, North Manchester, Ind.

Application August 30, 1939, Serial No. 292,705

4 Claims. (Cl. 85—7)

This invention relates to improvements in vehicle couplings, and has more specific reference to the type utilized to hitch or join a trailer to automobiles, or motor-propelled vehicles, and one of the features of the present invention is to provide a device of this character having locking means to prevent the trailer coupler from becoming disengaged.

The principal object of the invention is to provide a coupler for joining a trailer to automobiles or other vehicles, novel means being employed to prevent accidental removal of the device when in use.

A further object of the invention is to provide a coupling pin having spring-actuated means cooperable with a lock pin to provide locking means for a trailer or the like to an automobile or motor-propelled vehicle.

A still further object of the invention is to provide a coupling pin having means for holding the device in inoperative position, when not in use, and also means to prevent the loss of the component parts.

Another object of the invention is to provide a device of this character which is characterized by its simplicity, durability of construction, and because of its extreme simplicity will be inexpensive to manufacture.

Other objects and advantages of the invention will become apparent during the course of the following description.

With the foregoing in view the invention resides in the novel subject matter hereinafter described and claimed, the description being supplemented by the accompanying drawing in which:

Figure 1 is an elevational view of the device.

Figure 2 is a vertical sectional view taken on line 2—2 of Figure 1, and

Figure 3 is a sectional view taken on line 3—3 of Figure 2.

In the drawing wherein for the purpose of illustration is shown a preferred embodiment of the invention, the numeral 4 generally designates the coupling pin which is adapted to be inserted through the aligned openings of a drawbar and coupling bar of a trailer and vehicle. The coupling pin 4 is provided with a bore 5, and a counterbore 6. The upper end of the coupling pin 4 is provided with a head having an annular retaining flange 7, and the head is provided with a transverse groove 8. The lower end of the coupling pin has an opening as at 9. A lock bolt 10 is freely inserted in the bore 5 and counterbore 6, and this lock bolt extends upwardly through the head of the coupling pin, and terminates in a right-angularly disposed handgrip 11 for manually operating the lock bolt axially in the coupling pin.

As shown to advantage in Figure 2 of the drawing, I make use of a spring 12 positioned on the lower end of the lock bolt 10. The terminal end of the lock bolt 10 is provided with a pin 13, on which is seated a washer 14. One end of the spring 12 is adapted to bear against an abutment or shoulder 15 of the counterbore 6, while the other end bears against the washer 14 thereby urging the lock bolt 10 downwardly in locked position. The numeral 16 designates a lock pin having a reduced portion intermediate its ends to define a notch 17. The free end of the lock bolt 10 seats within the notch 17, and is held therein through the medium of the spring 12, whereby the lock pin 16 is held in locked engagement with the coupling pin 4. A cotter pin 18 is inserted through the groove 8 and an aligned opening 19 of the lock bolt 10. As a safety feature of the present disclosure I make use of a chain 20 which is secured at one end to the eye of the cotter pin 18, while the other end is secured to a cotter pin as at 21. Thus through the instrumentality of the chain and associated parts provision is made to prevent the loss of the respective parts. Then, too, the cotter pin 18 is utilized to hold the lock bolt 10 disengaged from the lock pin 16. To accomplish that end, the operator lifts the lock bolt 10 upwardly and by giving the bolt a slight turn to the left or right and the compression of the spring 12 will cause the cotter pin to ride out of the groove 8, and it is then seated on the head of the coupling pin 4, as clearly illustrated in Figure 1 of the drawing.

The operation of the device is as follows:

The coupling pin 4 is inserted through the elements to be coupled together, and the lock pin 16 is then inserted through the opening 9. Thus the head flange 7 and the lock pin 16 act to prevent accidental removal of the coupling pin from the hitched elements. After the lock pin 16 is inserted the lock bolt 10 is pressed downwardly compressing the spring 14, and the end of the bolt 10 will seat in the notch 17, and is held locked therein by means of the spring 12. The cotter pin is then inserted in the aligned groove 8 and opening 19 of the lock bolt. When the lock bolt is to be removed the operator turns the bolt slightly to the left or right which compresses the spring and permits the cotter pin to move out of the groove 8, and releases the bolt from the lock pin. By seating the cotter pin 18 on the head, as seen in Figure 1 of the drawing, the bolt is held in an inoperative position.

While the device is designed principally for hitching a trailer to a drawbar of an automobile, or motor-driven vehicle, it is obvious that the device may be used for other purposes for coupling or hitching other elements together.

From the foregoing it will be seen that I have provided a very novel and unique coupling pin for joining and locking the drawbar of a trailer, or the like, to a power-driven vehicle and one which may be quickly and easily attached and detached. Moreover, by the provision of my device an effective locking means to prevent accidental removal of the coupling pin is afforded, and additional safety means to prevent loss of the component parts of the device is provided.

It is thought a person skilled in the art to which the invention relates will be able to obtain a clear understanding of the invention after considering the description in connection with the drawing. Therefore, a more lengthy description is regarded as unnecessary.

Since excellent results are obtainable from the details disclosed, they are preferably followed. However, within the scope of the invention as claimed numerous modifications may, of course, be made.

Having described the invention what is claimed as new is:

1. A device of the class described comprising a coupling pin having a bore, a lock bolt slidable in said bore, a lock pin inserted through an opening in the lower end of said coupling pin, said lock pin having a notch, and one end of said lock bolt being adapted to be seated in said notch for holding said lock pin in locked position, and spring means for yieldably urging and holding said lock bolt seated in said notch.

2. A device of the class described comprising a coupling pin having a bore and a counterbore, said coupling pin having a head with a transverse groove disposed at its upper end, and said head having an annular flange, and said coupling pin having an opening at its lower end, a lock bolt workable in said bore, said lock bolt extending upwardly through the opening in said head and terminating in a handgrip, the lower terminal end of said lock bolt being provided with a pin, and a washer seated on said pin, a spring accommodated on said lock bolt, one end of said spring bearing against the shoulder of said counterbore, and the other end being adapted to bear against said washer for yieldably holding said lock bolt in a downwardly extended position, a lock pin removably inserted in the opening of said coupling pin, said lock pin having a notch intermediate its ends, and the terminal end of said lock bolt being adapted to seat within said notch for locking said lock pin in said coupling pin, a cotter pin inserted through the groove of said head and an aligned opening in said lock bolt.

3. A coupling pin of the class described comprising a bore, a lock bolt slidable in said bore, a lock pin disposed in the lower end of said coupling pin, and one end of said lock bolt engaging said lock pin to prevent lateral displacement of said pin, and means for holding said lock bolt and lock pin in locked position.

4. A lock-equipped device of the class described comprising a pin having a bore and a counterbore, one end of said pin being provided with an annular retaining flange, and said flange having a transverse groove therein, a lock bolt slidable in said bore, said lock bolt having a right-angularly disposed handle for manually locking said bolt, and having an opening intermediate its ends, a lock-pin having a reduced portion defining a notch, and the lower free end of said lock bolt being seated in said notch, a spring coiled around the lower end of said bolt and secured at one end to the bolt, and the other end of said spring bearing against the shoulder of the counterbore, and a cotter pin disposed in the aligned groove of said flange and the opening in said lock bolt for holding the latter in an inoperative position.

CHARLES M. BLOCHER.